(12) United States Patent
Song et al.

(10) Patent No.: US 9,519,524 B2
(45) Date of Patent: *Dec. 13, 2016

(54) PROVIDING LOCK-BASED ACCESS TO NODES IN A CONCURRENT LINKED LIST

(75) Inventors: Chunyan Song, Bellevue, WA (US); Joshua Phillips, Seattle, WA (US); John Duffy, Renton, WA (US); Tim Harris, Cambridge (GB); Stephen H. Toub, Seattle, WA (US); Boby George, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/524,665

(22) Filed: Jun. 15, 2012

(65) Prior Publication Data
US 2012/0254139 A1    Oct. 4, 2012

Related U.S. Application Data

(63) Continuation of application No. 12/428,247, filed on Apr. 22, 2009, now Pat. No. 8,224,799.

(51) Int. Cl.
*G06F 17/30* (2006.01)
*G06F 9/52* (2006.01)

(52) U.S. Cl.
CPC ......... *G06F 9/526* (2013.01); *G06F 17/30958* (2013.01)

(58) Field of Classification Search
USPC ........................................ 707/704, 791, 800
See application file for complete search history.

(56) References Cited

U.S. PATENT DOCUMENTS

| | | | | |
|---|---|---|---|---|
| 4,227,245 | A * | 10/1980 | Edblad et al. | 700/95 |
| 6,032,216 | A | 2/2000 | Schmuck et al. | |
| 7,117,502 | B1 * | 10/2006 | Harris | 719/315 |
| 7,774,569 | B1 * | 8/2010 | Chatterjee et al. | 711/163 |
| 7,873,612 | B2 * | 1/2011 | McKenney et al. | 707/704 |
| 2005/0022047 | A1 * | 1/2005 | Chandrasekaran | 714/4 |
| 2007/0014240 | A1 * | 1/2007 | Kumar et al. | 370/231 |
| 2007/0198519 | A1 | 8/2007 | Dice et al. | |
| 2007/0198978 | A1 * | 8/2007 | Dice et al. | 718/100 |
| 2007/0198979 | A1 * | 8/2007 | Dice et al. | G06F 9/466 718/100 |

(Continued)

OTHER PUBLICATIONS

Dice, et al."Transactional Locking II", Retrieved at<<http://research.sun.com/scalable/pubs/DISC2006.pdf>>, pp. 15.

(Continued)

*Primary Examiner* — Son T Hoang
(74) *Attorney, Agent, or Firm* — Kevin Sullivan; Micky Minhas

(57) ABSTRACT

A method of providing lock-based access to nodes in a concurrent linked list includes providing a plurality of striped lock objects. Each striped lock object is configured to lock at least one of the nodes in the concurrent linked list. An index is computed based on a value stored in a first node to be accessed in the concurrent linked list. A first one of the striped lock objects is identified based on the computed index. The first striped lock object is acquired, thereby locking and providing protected access to the first node.

18 Claims, 6 Drawing Sheets

(56) References Cited

U.S. PATENT DOCUMENTS

2008/0104141 A1* 5/2008 McMahon .......... G06F 17/2288
   707/1
2008/0126357 A1* 5/2008 Casanova et al. .............. 707/10
2008/0228691 A1  9/2008 Shavit et al.
2009/0210420 A1* 8/2009 Rapp ................................ 707/8

OTHER PUBLICATIONS

"Reducing Lock Contention—Java Concurrency in Practice", Retrieved at<<http://book.javanb.corn/java-concurrency-in-Practice/ch11lev1sec4.html>>, pp. 8.

"Performance Optimization in ConcurrentHashMap", Retrieved at<<http://floatingpoint.tinou.com/2008/09/performance-optimization-in-concurrenthashmap.html>>, pp. 3.

"Virtuoso Database Engine ", Retrieved at<<http://virtuoso.openlinksw.com/dataspace/dav/wiki/Main/VOSEngine>>, pp. 3.

"Linked List" Retrieved at <<http://en.wikipedia.org/wiki/Linked_list>>, 18 pgs.

Herlihy, Maurice et al., The Art of Multiprocessor Programming, Copyright 2008, 529 pages, Morgan Kaufmann Publishers, Burlington, MA.

* cited by examiner

PROVIDING LOCK-BASED ACCESS TO NODES IN A CONCURRENT LINKED LIST

CROSS-REFERENCE TO RELATED APPLICATION

This application is a continuation of U.S. application Ser. No. 12/428,247, filed Apr. 22, 2009, now U.S. Pat. No. 8,224,799, the specification of which is incorporated by reference herein.

BACKGROUND

A linked list is a data structure that can be used to implement other data structures. A linked list typically includes a sequence of nodes, with each node including a value and one or two references or links that point to adjacent node(s). In a singly-linked list, the nodes each include a single link that points to the next node. In a doubly-linked list, the nodes each include a first link that points to the previous node and a second link that points to the next node.

Out of all of the concurrent data structures, a linked list is difficult to make thread-safe due to the typically unrestricted arbitrary access to the list's nodes. In contrast to queues and stacks that typically provide access strictly to end nodes, linked lists typically allow direct access to any node, complicating semantics and a scalable implementation.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One embodiment provides a concurrent linked list algorithm with improved performance over prior implementations. Previous algorithms for such a data structure have used coarse-grained locking synchronization, which locks the whole list on the method level. Other implementations are lock-free, or use a fine-grained locking mechanism, but these implementations put restrictions on the data structures to simplify the synchronization model, and as a result compromise usability.

One embodiment provides a method of providing lock-based access to nodes in a concurrent linked list using striped lock objects. Each striped lock object locks at least one of the nodes in the concurrent linked list. An index is computed based on a value stored in a node to be accessed in the concurrent linked list. One of the striped lock objects is identified based on the computed index. The identified lock object is acquired to lock and provide protected access to the node.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
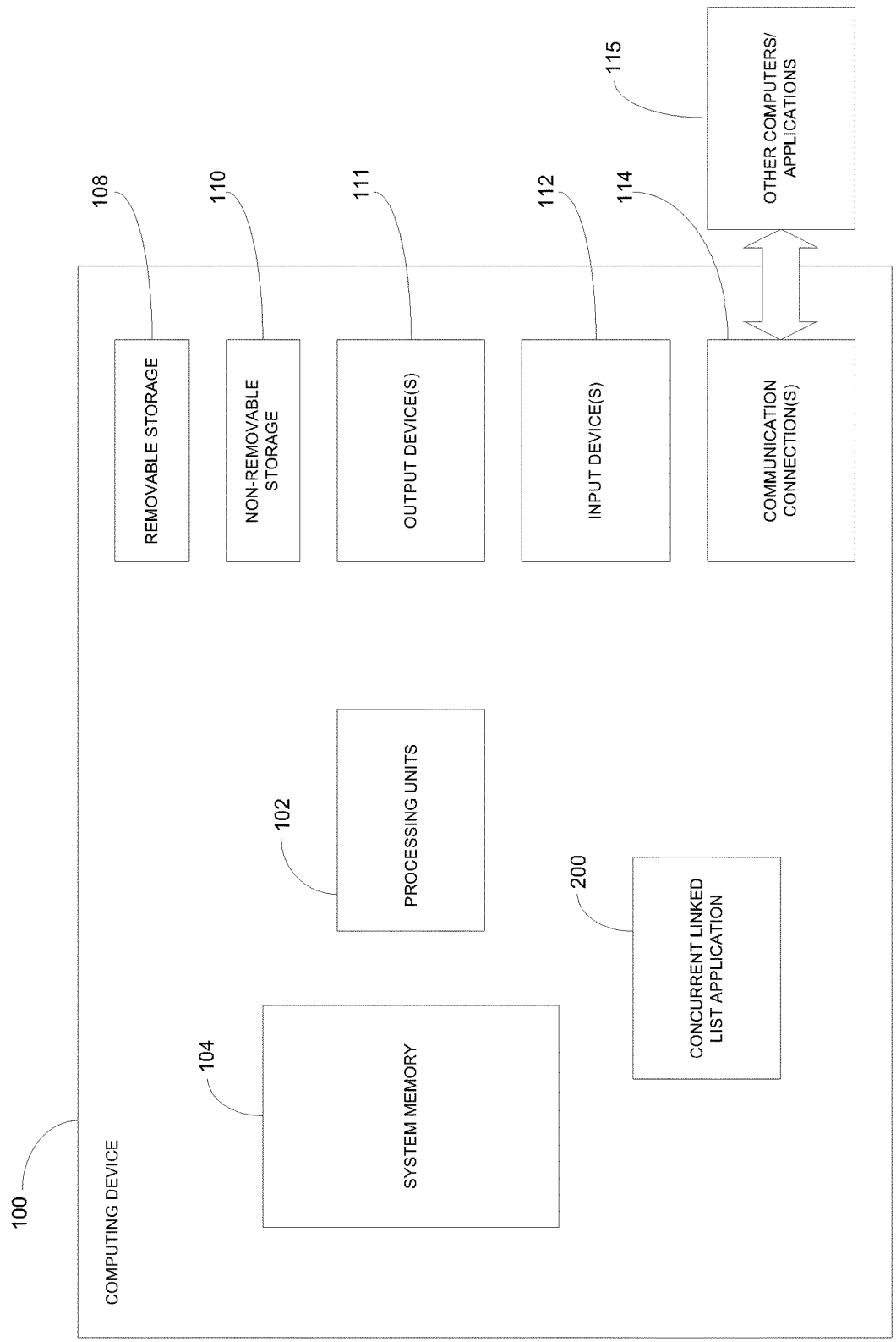
FIG. 1 is a diagram illustrating a computing system suitable for executing a concurrent linked list application according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides a concurrent linked list application, but the technologies and techniques described herein also serve other purposes in addition to these. In one implementation, one or more of the techniques described herein can be implemented as features within a framework program such as Microsoft® .NET Framework, or within any other type of program or service.

A sequential linked list data structure LinkedList<T> in Microsoft® .NET 2.0 supports the following core operations: (1) AddAfter/AddBefore—adds a new node or value after/before an existing node in the LinkedList<T>; (2) Remove—removes the first occurrence of a node or value from the LinkedList<T>; (3) Find—finds the first node that contains the specified value; and (4) Count—returns the number of elements in the list.

Accordingly, there is a LinkedListNode<T> type in Microsoft® .NET 2.0 which has the following properties: (1) List—gets which LinkedList<T> this node belongs to; (2) Next—gets the next node in the list; (3) Previous—gets the previous node in the list; and (4) Value—gets and sets the value of the node. Similar operations and properties are provided for the LinkedList type in Java.

One embodiment provides a concurrent linked list (ConcurrentLinkedList<T>) that supports a concurrent version of all of the operations provided by the sequential LinkedList<T> in Microsoft® .NET 2.0 and provides thread safety. One embodiment provides a concurrent linked list algorithm with improved performance over prior implementations. Previous algorithms for such a data structure have used coarse-grained locking synchronization, which locks the whole list on the method level. Other implementations are lock-free, or use a fine-grained locking mechanism, but these implementations put restrictions on the data structures to simplify the synchronization model, and as a result compromise usability.

For example, one previous implementation of a concurrent linked list algorithm is lock-free using Compare-And-Swap (CAS). This algorithm assumes the following restrictions on the data structure: (1) List nodes are hidden from the users (this restriction prohibits many list operations); (2) list elements are strictly increasing or decreasing (in other words, the list must be sorted, and no duplicate values are allowed); and (3) internally, the list is singly-linked but not doubly-linked. These restrictions make a lock-free implementation possible using Compare-And-Swap, but it weakens usability. Such an implementation does not have a linked list node structure, and it is more of a list-based set (i.e., one of the data structures that can be implemented using a linked list), rather than a concurrent version of a linked list.

In addition, for a doubly-linked list, most write operations involve writing to multiple memory locations atomically. For example, an insert operation will lock both the preceding and following nodes of the specified location, and a single CAS is not sufficient for this situation. Some research papers have assumed an atomic primitive Double-Compare-And-Swap (DCAS), but there is typically no hardware support for it.

Other concurrent linked list implementations suffer from problems similar to those of the lock-free implementations. For example, another previous algorithm uses fine-grained locking This algorithm creates a lock for each node, and every write operation on the node first acquires its lock. A challenge for fine-grained locking is how to use it to implement list traversal, which is performed for many operations such as the Find method. A first option for dealing with this challenge is acquiring all locks, which is a costly practice. A second option is using hand-over-hand locking, but it is not atomic. With hand-over-hand locking, a thread takes a lock on a first node, and while still holding that lock, takes a lock on a second node. The thread then releases the lock on the first node, and while holding the lock on the second node, the thread takes the lock on the third node, and so on.

The Find method should be atomic to avoid the following scenario: Given a list [1, 2, 3, 4, 5, 6], thread A calls "Find" to return the first node with value 4, by traversing the list from head to tail. Suppose that thread B moves the nodes around in the list. If when thread A is sitting on the node with value 3, and thread B moves the node with value 4 to lie between node 1 and node 2, thread A may precede without knowing what happened, and miss the value it was supposed to return. This behavior cannot be replicated using sequential composition, because node 4 was never missing from the list, and any Find(4) calls should return the node.

FIG. 1 is a diagram illustrating a computing device 100 suitable for executing a concurrent linked list application according to one embodiment. In the illustrated embodiment, the computing system or computing device 100 includes a plurality of processing units 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media (e.g., computer-readable storage media storing computer-executable instructions for performing a method). Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store the desired information and that can be accessed by computing device 100, and does not include transitory storage media. Any such non-transitory computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes a concurrent linked list application 200 for providing concurrent access by multiple threads to nodes in a concurrent linked list using value-based striped locks for thread synchronization. The coarse-grain locking of some prior approaches, which locks at the method level, deteriorates performance by serializing operations on the data structure. In contrast, the concurrent linked list application 200 according to one embodiment uses a striped-locking algorithm for a scalable implementation of a concurrent linked list with improved performance over prior approaches. Concurrent linked list application 200 is described in further detail below with reference to FIG. 2.

Figure 2:
FIG. 2 is a diagrammatic view of a concurrent linked list application for operation on the computer system illustrated in FIG. 1 according to one embodiment.

FIG. 2 is a diagrammatic view of a concurrent linked list application 200 for operation on the computing device 100 illustrated in FIG. 1 according to one embodiment. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Concurrent linked list application 200 includes program logic 202, which is responsible for carrying out some or all of the techniques described herein. Program logic 202 includes logic 204 for locking nodes of a concurrent linked list using striped lock objects; logic 206 for computing indices based on node values, hash codes, and a total number of striped lock objects; logic 208 for identifying striped lock objects based on the computed indices; logic 210 for acquiring identified striped lock objects to thereby lock and provide protected access to corresponding ones of the nodes; logic 212 for determining whether nodes have moved; logic 214 for sorting the indices; logic 216 for performing operations on the concurrent linked list using the striped lock objects; and other logic 218 for operating the application.

Turning now to FIGS. 3-6, techniques for implementing one or more embodiments of concurrent linked list application 200 are described in further detail. In some implementations, the techniques illustrated in FIGS. 3-6 are at least partially implemented in the operating logic of computing device 100.

Figure 3:
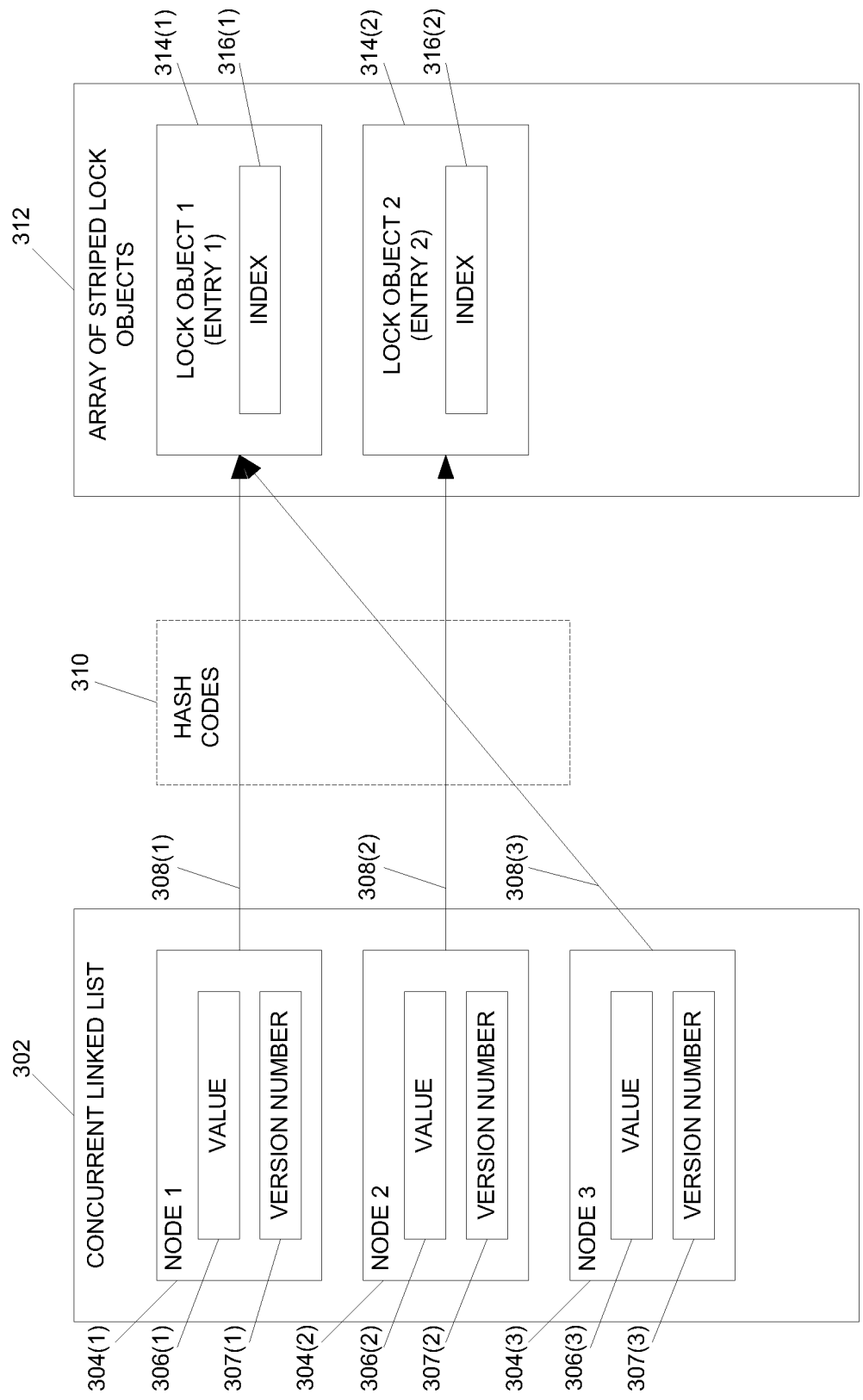
FIG. 3 is a block diagram illustrating a concurrent linked list and an array of striped lock objects according to one embodiment.

FIG. 3 is a block diagram illustrating a concurrent linked list 302 and an array of striped lock objects 312 according to one embodiment. The concurrent linked list 302 includes a plurality of nodes 304(1)-304(3) (collectively referred to as nodes 304). Values 306(1)-306(3) (collectively referred to as values 306) are stored in the nodes 304(1)-304(3), respectively. Nodes 304(1)-304(3) also include respective version numbers 307(1)-307(3) (collectively referred to as version numbers 307). The array of striped lock objects 312 includes a plurality of entries (striped lock objects) 314(1)-314(2) (collectively referred to as entries or striped lock objects 314). The striped lock objects 314(1)-314(2) include respective associated indices 316(1)-316(2) (collectively referred to as indices 316). Each of the striped lock objects 314 is associated with and is configured to lock at least one of the nodes 304. In the illustrated embodiment, striped lock object 314(1) is associated with and is configured to lock non-contiguous nodes 304(1) and 304(3) as indicated by arrows 308(1) and 308(3), respectively, and striped lock object 314(2) is associated with and is configured to lock node 304(2) as indicated by arrow 308(2). The mapping between nodes 304 and striped lock objects 314 according to one embodiment is determined based on the values 306 stored in the nodes 304 and based on a set of hash codes 310, as described in further detail below. The hash codes 310 according to one embodiment are not a predefined set of numbers, but rather are generated by a hash code algorithm. In one embodiment, the hash codes 310 are integers between −2147483648 and +2147483647 (i.e., between $-2^{31}$ and $+2^{31}-1$).

Each striped lock object 314 in array 312 guards a part (e.g., a set of nodes 304) of the concurrent linked list 302. The mapping from a given node 304 to the index 316 of a striped lock object 314 is derived from the node value 306. In one embodiment, a hash value is used, and the computation according to one embodiment is shown in the following Pseudo Code Example I:

PSEUDO CODE EXAMPLE I
(node.Value.GetHashCode( )&0x7fffffff) % m_stripedLocks.Length In Example I, m_stripedLocks represents the array 312 of striped lock objects 314, and m_stripedLocks.Length represents the length (i.e., total number of lock objects 314) in the array 312. The method node.Value.GetHashCode( ) in Example I returns a hash code from hash codes 310 corresponding to the value 306 of a node 304 specified by node.Value. The Microsoft® .NET framework provides a default virtual method GetHashCode for all types, which is used in one embodiment of Example I. As shown in Example I, a logical AND operation (&) is performed on the hash code 310 returned by the node.Value.GetHashCode( ) method and the constant value, 0x7fffffff, and the result of the logical AND operation is divided by (%) the number of lock objects 314 in the array 312 (i.e., m_stripedLocks.Length). The logical AND operation gets rid of the most significant bit of the hash code, and makes sure that the result is a non-negative integer. The value computed by the above Example I is an integer between 0 and m_stripedLocks.Length−1, which corresponds to an index 316 in the striped lock array 312. In one embodiment, if multiple nodes 304 contain the same value 306, these nodes 304 will all map to the same striped lock object 314, and additional nodes 304 that contain different values 306 may also map to this same striped lock object 314, or to a different striped lock object 314, depending on the hash codes 310.

In one embodiment, concurrent linked list 302 is implemented as a ConcurrentLinkedList<T> data structure that supports a concurrent version of all of the operations provided by the sequential LinkedList<T> in Microsoft® .NET 2.0, and provides thread synchronization. The concurrent linked list 302 preserves usability as if it were a sequential linked list. The concurrent linked list 302 is a doubly-linked list in one embodiment, supporting bi-directional traversal. The concurrent linked list 302 does not need to be sorted in one embodiment, and duplicated values are allowed. In one embodiment, the nodes 304 of list 302 are exposed to users, which enables node reusing. The concurrent linked list 302 according to one embodiment can be used to implement many other data structures, such as concurrent deque, concurrent bag, concurrent sorted list, and concurrent MRU cache.

In one embodiment, concurrent linked list 302 supports all of the core operations of the sequential version of LinkedList<T>, and also supports additional operations (e.g., TryInsertBetween, TryMove, and TryMoveAndUpdate). In one embodiment, concurrent linked list 302 supports the following operations: (1) TryAddBefore and TryAddAfter—inserts a new node 304 before or after a specified node 304; (2) Remove—removes the specified node 304; (3) Find—finds the first node 304 that contains the specified value; (4) Count—gets the approximate number of nodes 304 in the list 302; (5) TryInsertBetween—inserts a new node 304 between two specified adjacent nodes 304; and (6) TryMove and TryMoveAndUpdate—moves the specified node 304 to a new position in the list 302 (and updates its value if it is a TryMoveAndUpdate operation).

To lock a given node 304 according to one embodiment, an index 316 is computed based on the value 306 of that node 304 as shown in Pseudo Code Example I, and the lock object 314 with that computed index 316 is acquired. In one embodiment, in addition to locking that particular node 304, other nodes 304 that map to the same lock object 314 will be locked too. The following Pseudo Code Example II provides an example of mapping a node 304 to an index 316 in the array 312:

PSEUDO CODE EXAMPLE II

```
internal int GetStripedLockIndex(T value)
{
    if (value == null)
    {
        return 0;
    }
    else
    {
        return (value.GetHashCode( ) & 0x7fffffff) %
            m_stripedLocks.Length;
    }
}
```

As indicated in Example II, the node value 306 can be null, in which case "0" is returned as the index, otherwise the computation described above with respect to Example I is used to determine the index.

The following Pseudo Code Example III provides an example of acquiring a striped lock object 314 in array 312 after determining an index 316 as shown in Example II above:

PSEUDO CODE EXAMPLE III

```
void LockIndex(int index, ref bool lockTaken)
{
    if AcquireLock(m_stripedLocks[index]) is successful
        lockTaken = true;
    else
        lockTaken = false;
}
```

After computing the index 316 and acquiring the corresponding striped lock object 314, and after performing an operation involving the locked node 304, the lock object 314 is released and the node 304 is thereby unlocked. The following Pseudo Code Example IV provides an example of releasing a striped lock object 314 after an operation is done:

PSEUDO CODE EXAMPLE IV

```
void UnlockIndex(int index, bool lockTaken)
{
    if (lockTaken)
    {
        ReleaseLock(m_stripedLocks[index]);
    }
}
```

Acquiring multiple locks 314 at the same time can introduce deadlocks. For example, a deadlock may occur in the scenario given in the following Table I:

TABLE I

| Time | Thread A | Thread B |
|---|---|---|
| 0 | Monitor.Enter(m_stripedLocks[i]); | |
| 1 | | Monitor.Enter(m_stripedLocks[j]); |
| 2 | Monitor.Enter(m_stripedLocks[j]); | |
| 3 | . . . | Monitor.Enter(m_stripedLocks[i]); |
| | | . . . |

To prevent such a deadlock, in one embodiment, when multiple locks 314 are being acquired, these locks 314 are first sorted according to their respective indices 316, and then these locks 314 are acquired in ascending order of their indices 316. In another embodiment, the locks 314 are acquired in descending order of their indices 316. The order of the acquisition of locks (e.g., either ascending or descending) is consistent across the implementation in one embodiment. In one embodiment, the locks may initially be attempted to be acquired without sorting, and then, if a lock is encountered that is not available, then the already-acquired locks are released, the locks to be acquired are sorted, and then re-acquired in sorted order. In one embodiment, the locks 314 may be released in any arbitrary order. For some operations (e.g., CopyTo, ToList, ToArray, Clear, Count, GetEnumerator, and the "slow route" (discussed below) of Find for ConcurrentLinkedList<T>), all locks 314 in the array 312 may be acquired, thereby locking all nodes 304 in the list 302 and "freezing" the list 302.

In one embodiment, all read methods/properties performed on a single node 304 in list 302 are non-blocking These methods/properties according to one embodiment include the First and Last properties of ConcurrentLinkedList<T>, and Next, Previous, List, and Value properties of ConcurrentLinkedListNode<T>.

A write method according to one embodiment is one that modifies any part of the concurrent linked list 302, including inserting nodes 304, deleting nodes 304, moving nodes 304 within the list 302, and assigning a new value 306 to a node 304. Many of the write methods for concurrent linked list 302 may involve modifying multiple nodes 304. For example, in the method TryAddAfter (ConcurrentLinkedListNode<T> referenceNode, T value), after a new node 304 is created with the specified value 306, referenceNode.Next.Previous will be modified to point to the new node, and then referenceNode.Next will be modified to point to the new node.

The following explains a general way to implement a write method for concurrent linked list 302 according to one embodiment. First, the set of the nodes 304 that are to be modified is a critical resource. Indices 316 are computed based on the values 306 of these nodes 304; the computed indices 316 are sorted; and lock objects 314 corresponding to the indices 316 are acquired (e.g., in ascending order). Second, a validation step is performed. During this step, it is determined whether any nodes 304 have been changed (e.g., been moved or deleted, or have been given a new value), and some method-specific conditions may be checked. If any validation fails, all locks 314 acquired in the first step are released, and depending on which method it is, the method may be aborted, or the process may start over from the first step. Third, operations inside the critical resource are performed. Since all appropriate locks 314 have been acquired at this point, there will be no race condition. Fourth, all of the acquired locks 314 are released, and the method is exited.

One of the benefits of the striped-locking algorithm according to one embodiment is that it provides fine-grained locking for the Find operation, whereas other implementations use an inefficient global locking approach for this operation. The Find(T value) method of a linked list returns the first node with the specified value. If the Find method is not atomic, the target node may be skipped. There are two situations that could result in the target node being skipped when the Find method traverses the list: (1) The target node moves behind the current node that the Find method is standing on; and (2) the current node that the Find method is standing on moves forward and passes the target node. To prevent the first situation from happening, one embodiment locks all nodes 304 that map to the same striped lock 314 as the provided value parameter does, which prevents the target node 304 (if it exists in the list 302) from being moved by another thread while the current thread executes the Find method. To prevent the second situation from happening, one embodiment uses a hand-over-hand version-number algorithm. This algorithm according to one embodiment identifies a "conflict" when it sees any nodes 304 being moved (e.g., by other threads calling the TryMove method or the TryMoveAndUpdate method) during traversal of the nodes 304.

One embodiment uses a fast route and a slow route for a Find operation. The fast route according to one embodiment involves the following three cases: (1) If the value specified in the Find method is found during a traversal of the list 302, the node 304 containing the specified value is returned, without worrying about whether any nodes 304 in the list 302 have been moved or not (i.e., the target node 304 is returned immediately); (2) if the value specified in the Find method is not found during a traversal of the list 302, and it is determined that none of the nodes 304 have been moved during the traversal (and accordingly nodes 304 were not skipped), it can be concluded that the specified value does not exist and the method returns false immediately; (3) if the value specified in the Find method is not found during a traversal of the list 302, and it is determined that one or more of the nodes 304 have been moved during the traversal, it is possible that the target node 304 has been skipped, and the fast route is repeated.

In one embodiment, the fast route is performed for a Find method until the first or the second cases above are encountered, or until the fast route has been performed a threshold number of times. If the first and second cases are not encountered before the threshold number has been reached, one embodiment switches to the slow route.

The slow route according to one embodiment involves acquiring all of the locks 314 in the array 312 to lock all of the nodes 304 in the list 302, and thereby freeze the list 302. While the list 302 is frozen, the nodes 304 are traversed to search for the value specified by the Find method. In one embodiment, the slow route is used only when there is serious contention between multiple threads, so overall the Find method using the fast route and the slow route is faster than a coarse-grained locking mechanism.

As mentioned above, one embodiment uses a hand-over-hand version-number algorithm to identify conflicts (e.g., identify when nodes 304 are moved). To determine whether there are any conflicts during traversing of the list 302 by a Find method, a version number 307 is added to each node 304, with an initial value of zero. In the TryMove and TryMoveAndUpdate methods, after acquiring the locks 314 for moving a node 304, and before moving the node 304, the version number 307 of the node 304 is increased by a value of one (making it an odd integer at this point). After moving the node 304 (all the pointers are set to their new values), the version number 307 of the node 304 is increased by a value of one again (making it an even integer). Thus, whenever a version number 307 of a node 304 is odd, this indicates that the node 304 is being moved, and indicates a conflict.

During the fast route of the Find method according to one embodiment, a boolean value, Conflict, is maintained, with an initial value of false, to indicate whether a conflict occurs during the list traversal. A hand-over-hand style is used to keep track of two version numbers 307 of adjacent nodes 304 at a time. For example, at first the left hand is put on a first node (e.g, node 304(1) and the right hand is put on a second node (e.g., node 304(2)). Putting a hand on a node according to one embodiment means to store the value 306 of the node 304. The first node 304 is processed by the left hand, while keeping the right hand on the second node 304. Processing a node 304 according to one embodiment means comparing the value 306 of this node 304 with the value specified by the Find method, to see if this node 304 is the node 304 that the Find method is looking for. After finishing processing of the first node 304, the left hand is moved off the first node 304, and put on the third node (e.g., node 304(3)), and processing of the second node 304 begins using the right hand, and so on.

Assume that the variable, curr, represents the node 304 about to be processed using the left hand, and in the previous iteration, the version number of the variable, curr, was stored in the variable, bufferedCurrVersionNumber. In the current iteration, the following will be performed in one embodiment: (1) Before beginning processing curr using the left hand, some preparation work is done for the right hand for the next iteration (i.e., putting the right hand on the next node 304, which is represented by the variable, next), by storing the next node 304 of curr in the variable, next, and next's version number in the variable, bufferedNextVersionNumber; and if bufferedNextVersionNumber is odd, then the variable, conflict, is set to true; (2) validate if next is still curr's next node (it could have been changed by another thread right after the first step), and if bufferedNextVersionNumber does not change, and set the variable, conflict, to true if either condition is false; (3) process node curr using the left hand by comparing the value of curr with the value specified by the Find method (if the compared values are equal, this indicates that a target node has been found, and the node curr is returned as the result of the Find method, and if the compared values are not equal, a check is made on whether the curr node has been moved since the last time it was buffered, by evaluating (bufferedCurrVersionNumber!=curr.Version), and if this condition is true, the variable, conflict, is set to true); and (4) Do the following assignments: curr=next; and bufferedCurrVersionNumber=bufferedNextVersionNumber. Once the next iteration is entered, the work on the right hand will begin, and the above steps will be repeated with left and right switched.

If the type, T, in ConcurrentLinkedListNode<T>, is a large value type, that is, for example, a type that takes more than one machine word to store in memory, then multiple memory accesses will be used to read a value of type T, and reading the value of type T is not an atomic operation. A situation known as torn-reading happens when a part of the value in memory is modified by another thread while the current thread is reading the value. This situation cannot be solved by wrapping Value_get with a lock, because Value_get is called inside write operations, and by locking it, the locks may not be acquired in a proper order (e.g., ascending order), which can cause a deadlock. This problem is solved in one embodiment by using boxing when reading large value types, and introducing a static field, s_irregularValueType, in ConcurrentLinkedListNode<T> to indicate whether a value of T is to be boxed when reading.

Figure 4:
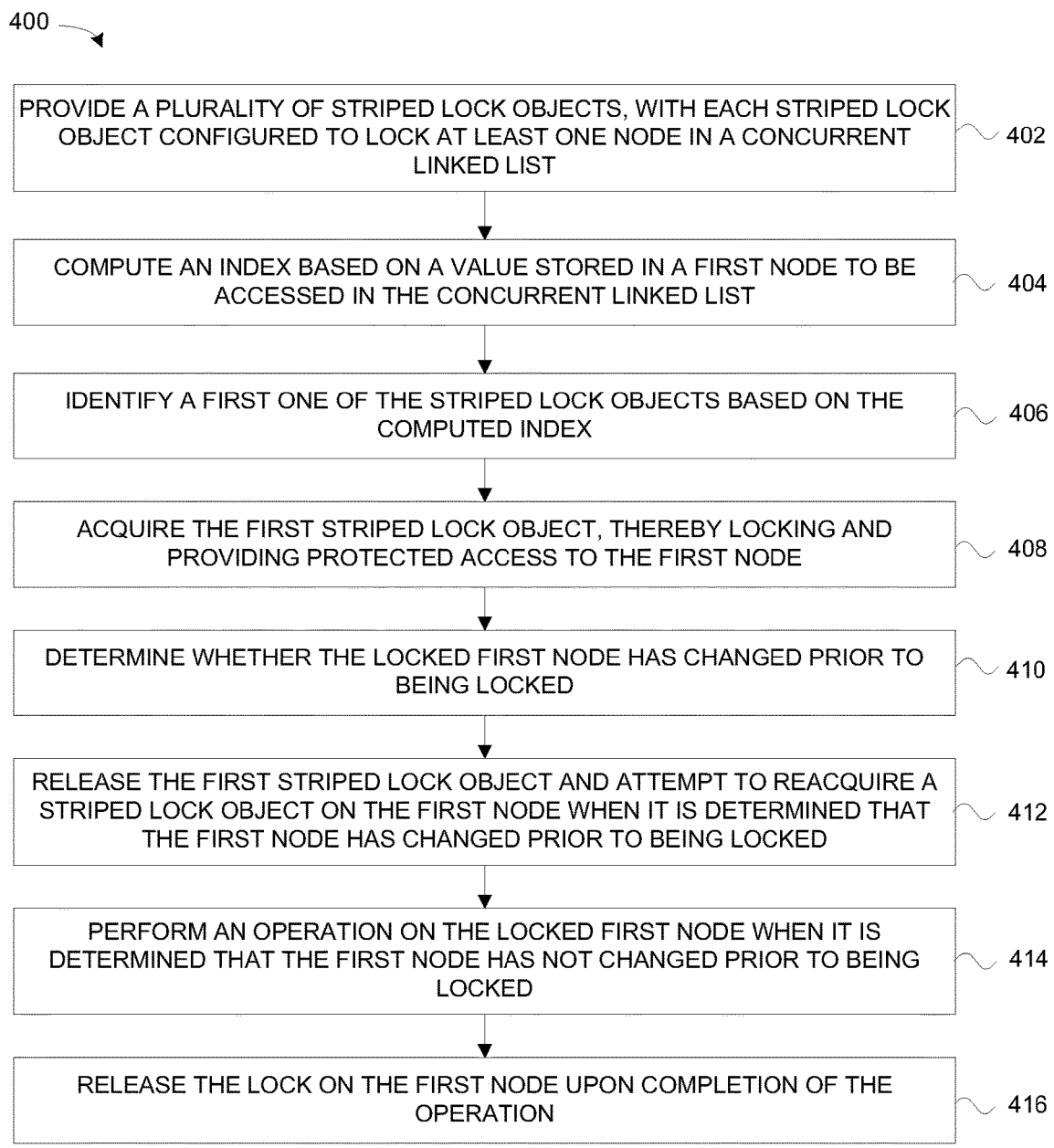
FIG. 4 is a flow diagram illustrating a method of providing lock-based access to nodes in a concurrent linked list according to one embodiment.

FIG. 4 is a flow diagram illustrating a method 400 of providing lock-based access to nodes 304 in a concurrent linked list 302 according to one embodiment. At 402 in method 400, a plurality of striped lock objects 314 are provided, with each striped lock object configured to lock at least one of the nodes 304 in the concurrent linked list 302. At 404, an index 316 is computed based on a value 306 stored in a first node to be accessed in the concurrent linked list 302. The term "first node" according to one embodiment is not limited to the first occurring node 304(1) in the list 302, but rather it could be any one of the nodes 304 in the list 302. In one embodiment, an index 316 is computed at 404 by identifying a hash code 310 based on the value 306 stored in the first node 304, and computing the index 316 based on the identified hash code 310 and a total number of the striped lock objects 314. In one embodiment, a logical AND operation is performed on the hash code 310 and a constant value, and the index 316 is computed at 404 by dividing a result of the AND operation by the total number of the striped lock objects 314.

At 406, a first one of the striped lock objects 314 is identified based on the computed index 316. At 408, the first striped lock object is acquired, thereby locking and providing protected access to the first node. The term "first striped lock object" according to one embodiment is not limited to the first occurring lock object 314(1) in the array 312, but rather it could be any one of the lock objects 314 in the array 312. In one embodiment, the acquiring of the first striped lock object at 408 locks a plurality of non-contiguous ones of the nodes 304 in the concurrent linked list 302, including the first node.

At 410, it is determined whether the locked first node 304 has changed prior to being locked. At 412, the first striped lock object 314 is released and an attempt is made to reacquire a striped lock object 314 on the first node 304 when it is determined at 410 that the first node has changed prior to being locked. At 414, an operation is performed on the locked first node 304 when it is determined at 410 that the first node 304 has not changed prior to being locked. At 416, the lock 314 on the first node 304 is released upon completion of the operation at 414.

Figure 5:
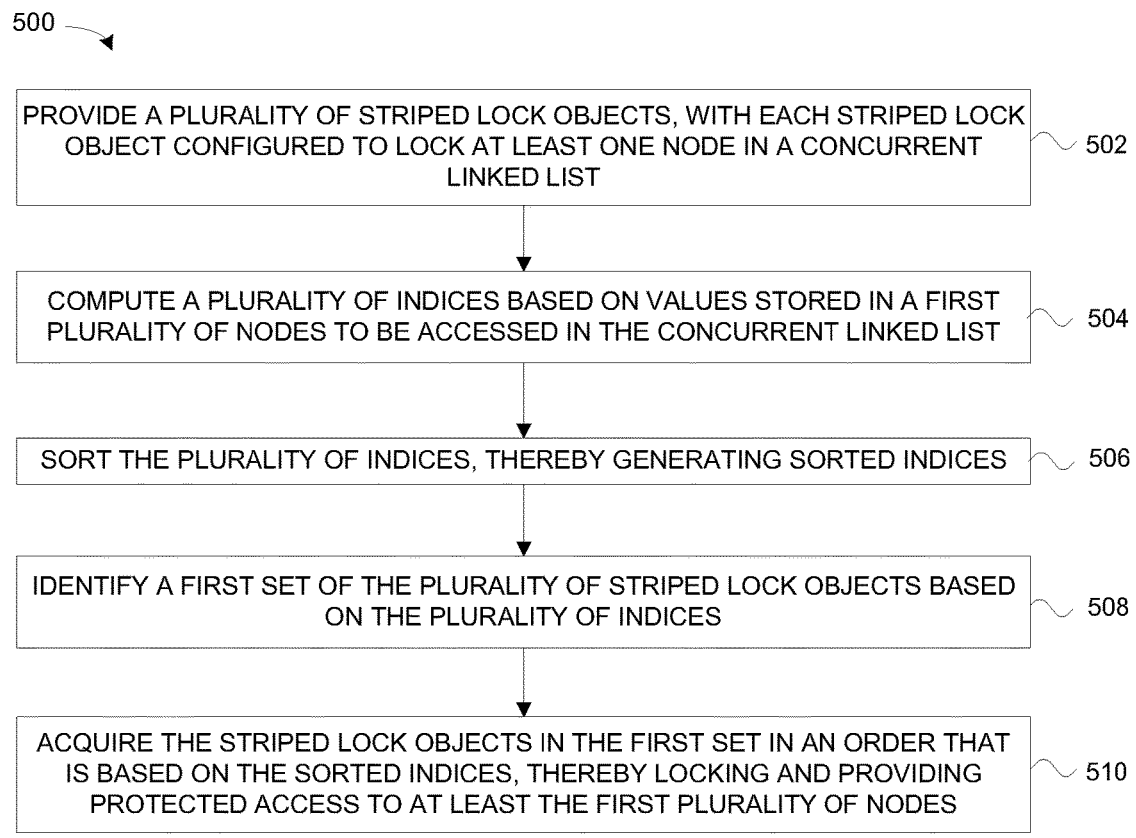
FIG. 5 is a flow diagram illustrating a method of providing lock-based access to nodes in a concurrent linked list according to another embodiment

FIG. 5 is a flow diagram illustrating a method 500 of providing lock-based access to nodes 304 in a concurrent linked list 302 according to another embodiment. At 502 in method 500, a plurality of striped lock objects 314 are provided, with each striped lock object configured to lock at least one of the nodes 304 in the concurrent linked list 302. At 504, a plurality of indices 316 are computed based on values 306 stored in a first plurality of nodes 304 to be accessed in the concurrent linked list 302. At 506, the plurality of indices 316 is sorted, thereby generating sorted indices. At 508, a first set of the plurality of striped lock objects 314 is identified based on the plurality of indices 316. At 510, the striped lock objects 314 in the first set are acquired in an order that is based on the sorted indices, thereby locking and providing protected access to at least the first plurality of nodes 304.

Figure 6:
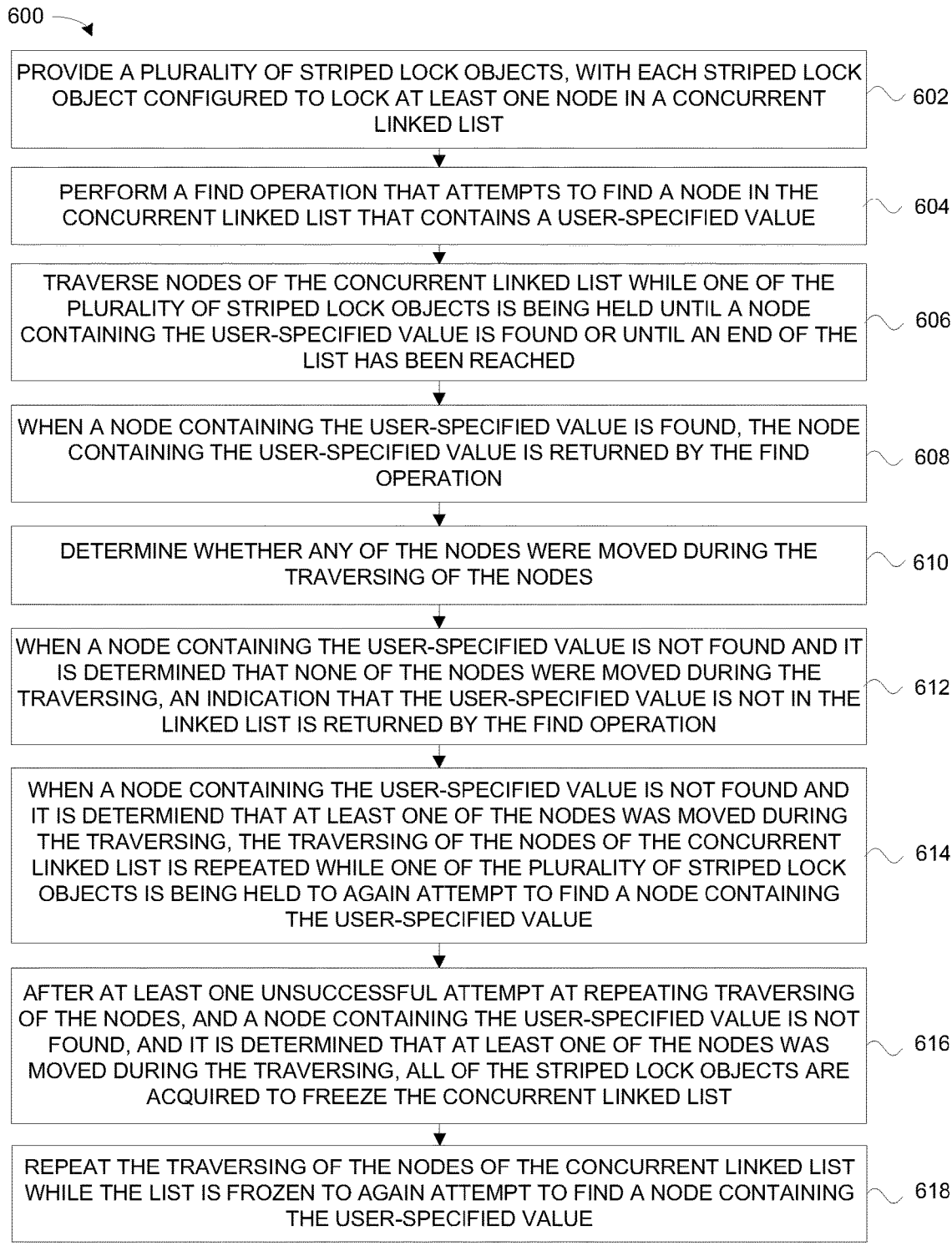
FIG. 6 is a flow diagram illustrating a method of providing lock-based access to nodes in a concurrent linked list for a Find operation according to one embodiment.

FIG. 6 is a flow diagram illustrating a method 600 of providing lock-based access to nodes 304 in a concurrent linked list 302 for a Find operation according to one embodiment. At 602 in method 600, a plurality of striped lock objects 314 are provided, with each striped lock object configured to lock at least one of the nodes 304 in the concurrent linked list 302. At 604, a Find operation is performed that attempts to find a node 304 in the concurrent linked list 302 that contains a user-specified value. At 606, nodes of the concurrent linked list are traversed while one of the plurality of striped lock objects 314 is being held until a node 304 containing the user-specified value is found or until an end of the list 302 has been reached. In one embodiment, a single striped lock object 314 is acquired during a Find operation, which is determined by the user-specified value, and which could lock multiple nodes 304, including, but not limited to, nodes 304 with the user-specified value.

At 608, when a node 304 containing the user-specified value is found, the node containing the user-specified value is returned by the Find operation. At 610, it is determined whether any of the nodes 304 were moved during the traversing at 606. In one embodiment, the determination of whether any of the nodes 304 were moved at 610 is done by assigning version numbers 307 to the nodes 304, and modifying the version numbers 307 based on movement of the nodes 304. In one embodiment, the version numbers 307 of two adjacent nodes 304 at a time are tracked at 610 in a hand-over-hand manner, as described above with reference to FIG. 3.

At 612, when a node 304 containing the user-specified value is not found and it is determined at 610 that none of the nodes 304 were moved during the traversing at 606, an indication that the user-specified value is not in the linked list is returned by the Find operation. At 614, when a node 304 containing the user-specified value is not found and it is determined at 610 that at least one of the nodes 304 was moved during the traversing at 606, the traversing of the nodes 304 of the concurrent linked list 302 is repeated while one of the striped lock objects 314 is being held to again attempt to find a node 304 containing the user-specified value. At 616, after at least one unsuccessful attempt at repeating the traversing of the nodes 304 at 614, and a node 304 containing the user-specified value is not found and it is determined that at least one of the nodes 304 was moved during the traversing, all of the striped lock objects 314 are acquired to freeze the concurrent linked list 302. At 618, the traversing of the nodes 304 of the concurrent linked list 302 is repeated while the list 302 is frozen to again attempt to find a node 304 containing the user-specified value.

One embodiment of concurrent linked list application 200 uses a striped-locking thread synchronization scheme, which results in a more scalable algorithm with better performance compared to coarse-grained locking synchronization schemes. In contrast to other non-coarse-grained locking algorithms, one embodiment of concurrent linked list application 200 supports a concurrent version of all operations in a sequential link list. In addition, one embodiment of concurrent linked list application 200 preserves the atomicity of operations (e.g., Find, TryMove, TryMoveAndUpdate), which is infeasible in other non-coarse-grained locking algorithms.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method utilizing at least a computing device for providing lock-based access to nodes in a concurrent linked list, comprising:
    providing a plurality of striped lock objects, each striped lock object having a corresponding index and configured to lock at least one of the nodes in the concurrent linked list;
    identifying a hash code based on a value stored in a first node to be accessed in the concurrent linked list;
    computing an index based on the identified hash code and a total number of the plurality of striped lock objects;
    identifying a first one of the plurality of striped lock objects based on the computed index; and
    acquiring the first striped lock object, thereby locking and providing protected access to the first node.

2. The method of claim 1, wherein the acquiring the first striped lock object locks a plurality of non-contiguous ones of the nodes in the concurrent linked list including the first node.

3. The method of claim 1, and further comprising:
performing a logical AND operation on the hash code and a constant value different than the value stored in the first node; and
computing the index by dividing a result of the AND operation by the total number of the plurality of striped lock objects.

4. The method of claim 1, and further comprising:
computing a plurality of indices based on values stored in a first plurality of nodes to be accessed in the concurrent linked list; and
sorting the plurality of indices, thereby generating sorted indices.

5. The method of claim 4, further comprising: identifying a first set of the plurality of striped lock objects based on the plurality of indices; and
acquiring striped lock objects in the first set in an order that is based on the sorted indices, thereby locking and providing protected access to at least the first plurality of nodes.

6. The method of claim 1, and further comprising:
determining whether the locked first node has changed prior to being locked; and
releasing the first striped lock object and attempting to reacquire another striped lock object on the first node when it is determined that the first node has changed prior to being locked.

7. The method of claim 6, and further comprising:
performing an operation on the locked first node when it is determined that the first node has not changed prior to being locked; and
releasing the lock on the first node upon completion of the operation.

8. The method of claim 1, and further comprising:
performing a find operation that attempts to find a node in the concurrent linked list that contains a user-specified value.

9. The method of claim 8, and further comprising:
traversing the nodes of the concurrent linked list while one of the plurality of striped lock objects is being held until the node containing the user-specified value is found or until an end of the concurrent linked list has been reached.

10. The method of claim 9, and further comprising:
when the node containing the user-specified value is found, returning the found node containing the user-specified value.

11. The method of claim 10, and further comprising:
determining whether any of the nodes were moved during the traversing;
when the node containing the user-specified value is not found and it is determined that none of the nodes was moved during the traversing, returning an indication that the user-specified value is not in the concurrent linked list.

12. The method of claim 10, and further comprising:
determining whether any of the nodes were moved during the traversing;
when the node containing the user-specified value is not found and it is determined that at least one of the nodes was moved during the traversing, repeating the traversing of the nodes of the concurrent linked list while one of the plurality of striped lock objects is being held to again attempt to find the node containing the user-specified value.

13. The method of claim 12, and further comprising:
when the node containing the user-specified value is not found and it is determined that at least one of the nodes was moved during the traversing, acquiring all of the striped lock objects to freeze the concurrent linked list; and
repeating the traversing of the nodes of the concurrent linked list while it is frozen to again attempt to find the node containing the user-specified value.

14. The method of claim 9, and further comprising:
determining whether any of the nodes were moved during the traversing by assigning version numbers to the nodes, and modifying the version numbers based on movement of the nodes.

15. The method of claim 14, wherein the determining whether any of the nodes were moved during the traversing further comprises:
tracking corresponding version numbers of two adjacent nodes at a time in a hand-over-hand manner.

16. A computer-readable storage medium storing computer-executable instructions for performing a method of providing lock-based access to nodes in a concurrent linked list, comprising:
providing a plurality of striped lock objects, each striped lock object having a corresponding index and configured to lock at least one of the nodes in the concurrent linked list;
identifying a hash code based on a value stored in a first node to be accessed in the concurrent linked list; and
computing an index based on the identified hash code and a total number of the striped lock objects;
identifying a first one of the plurality of striped lock objects based on the computed index; and
acquiring the first striped lock object, thereby locking and providing protected access to the first node.

17. The computer-readable storage medium of claim 16, wherein the acquiring the first striped lock object locks a plurality of non-contiguous ones of the nodes in the concurrent linked list including the first node.

18. A method utilizing at least a computing device for providing lock-based access to nodes in a concurrent linked list, comprising:
providing a plurality of value-based striped lock objects for the concurrent linked list, each striped lock object having a corresponding index and configured to lock at least one of the nodes in the concurrent linked list, and wherein at least one of the striped lock objects is configured to lock a plurality of the nodes in the concurrent linked list, and wherein the nodes in the concurrent linked list are arranged in sequence with each other, wherein each of the nodes including a reference that points to a next adjacent node in the sequence;
identifying a hash code based on a value stored in a first node to be accessed in the concurrent linked list
computing an index based on the identified hash code and a total number of the plurality of striped lock objects;
identifying a first one of the striped lock objects based on the computed index; and
acquiring the first striped lock object, thereby locking and providing protected access to at least the first node.

* * * * *